United States Patent [19]
Bowerman et al.

[11] Patent Number: 5,797,235
[45] Date of Patent: Aug. 25, 1998

[54] DOUBLE SKIN COMPOSITE STRUCTURES

[75] Inventors: Hugh Gordon Bowerman, Woking; Bassam Adeeb Burgan, Bracknell, both of England

[73] Assignee: British Steel PLC, London, England

[21] Appl. No.: 732,237

[22] PCT Filed: Mar. 31, 1995

[86] PCT No.: PCT/GB95/00754

§ 371 Date: Jan. 29, 1997

§ 102(e) Date: Jan. 29, 1997

[87] PCT Pub. No.: WO95/26856

PCT Pub. Date: Oct. 12, 1995

[30] Foreign Application Priority Data

Mar. 31, 1994 [GB] United Kingdom ............... 9406438
Mar. 31, 1994 [GB] United Kingdom ............... 9406441

[51] Int. Cl.$^6$ ........................................................ E04B 1/00
[52] U.S. Cl. .................... 52/582.1; 52/656.9; 52/281; 52/282.1; 403/230; 403/271
[58] Field of Search ........................ 403/230, 270, 403/271, 13, 14; 52/582.1, 656.9, 281, 282.1, 282.3, 285.1, 276, 277, 245

[56] References Cited

U.S. PATENT DOCUMENTS

| | | | |
|---|---|---|---|
| 2,671,539 | 3/1954 | Kiefer | 403/270 |
| 3,228,161 | 1/1966 | McCown | 52/282.1 |
| 3,685,222 | 8/1972 | Curtess | 52/282.3 X |

*Primary Examiner*—Creighton Smith
*Attorney, Agent, or Firm*—Kinney & Lange, P.A.

[57] ABSTRACT

A connector which provides a joint between two double skin composite panels of a structure. Each double skin composite panel comprises a pair of metal icing plates joined together by a plurality of cross-members and filled, at least partially, with a cementitious filler material. Each cross-member is connected to both facing plates and the connector comprises one or more seamless sections.

13 Claims, 2 Drawing Sheets

DOUBLE SKIN COMPOSITE STRUCTURES

This invention relates to double skin composite structures which comprise a layer of filler material (usually a cementitious material such as concrete) faced with plates (usually carbon steel) and methods of producing the same. A lighter filler material such as a filled synthetic resin may be employed for certain applications. More especially, but not exclusively, the invention concerns double skin composite structures assembled inter alia from double skin composite panels which comprise two facing plates positioned one on each side of a layer of concrete and connected thereto by cross members.

Double skin composite structures may be constructed from a variety of materials which themselves can be used in different ways. Usually, such structures comprise a steel-concrete-steel sandwich construction and exhibit similar characteristics to those of reinforced concrete structures and are advantageous in that the steel facing plates act as reinforcement to enable the required strength characteristics to be achieved with structures of overall depth less than those of reinforced concrete. The steel facing plates also define impermeable membranes which protect the concrete in use. High reinforcement ratios are possible and the steel plates act as permanent shuttering for the central concrete layer. The structures exhibit relatively high ductility and impact resistance, are lighter than conventional reinforced concrete and offer reduced construction costs and decreased build times.

Double skin composite structures are known which are assembled from a multiplicity of individual double skin composite panels, each panel being welded to its neighbouring panels.

Thus, GB-A-2136032 and GB-A-2136033 disclose offshore structures in which series of arcuate elements having inner and outer steel plates linked by steel webs and filled with cementitious material are welded together. Also, GB-A-2258669 discloses a concrete-filled steel bearing wall which comprises a pair of steel surface plates secured by connecting members and filled with concrete. Neither GB-A-2136032 nor GB-A-2136033 addresses the possibility of securing, for example, horizontal and vertical elements together. GB-A-2258669 discloses arrangements in which concrete-filled steel bearing walls support concrete flooring. In these arrangements, the concrete flooring simply overlies the upper end of the respective bearing wall to receive support therefrom.

It will be accepted that in all but the simplest of structures, it will be necessary to connect sections of joined double skin composite panels together to form, for example, "T" and "X" joints. To do so simply by welding together adjoining steel plates of neighbouring panels as intimated by GB-A-2136022 and GB-A-2136023 or in the manner proposed by GB-A-2258669 creates a number of problems, a major one being that some of the most critically stressed welds are inaccessible for inspection after the introduction of concrete between the steel plates. These welds are also difficult to make because of poor access, tending to increase the probability of defects which would cause problems in the structure's service life. Also, many of the welds are of necessity single sided resulting in poor fatigue classification. Also for curvilinear panels, considerable material wastage may occur in cutting out the plates to form the connections.

It is an object of the present invention to provide a double skin composite structure (and a method of producing the same) including such joints which overcomes, or at least alleviates, the problems discussed above.

A "seamless section" is an elongate non-planar section produced as a single piece to include two or more lengthwise extending elements each of which is inclined to its neighbouring element. Seamless sections may be produced by hot rolling, cold forming, extrusions, casting or other forming process. The angle between neighbouring elements may be a right angle or an angle below 90° or above 90°. Sections include "I" sections, "H" sections, "T" sections, channel sections, angled sections, and hollow sections. An important feature of a seamless section is that where neighbouring elements meet a radiussed transition of solid metal is formed.

By the term "double skin composite panel" is meant a panel which comprises two substantially parallel facing plates joined together by a plurality of connecting members disposed generally normal to the facing plates in a plurality of spaced rows with each connecting member secured to one or both facing plates, the panel interior being subsequently filled with a filler material, e.g. a cementitious material.

According to the present invention in one aspect, there is provided a double skin composite structure in which neighbouring double skin composite panels of the structure are connected by welding to a connector fabricated from one or more non-planar seamless sections.

In another aspect, the invention provides a connector for providing a joint between two double skin composite panels to produce a structure, each such double skin composite panel comprising a pair of metal facing plates joined together by a plurality of cross-members and filled, at least partially, with a filler material, each such cross-member being secured to one or both facing plates and the connector comprising at least one non-planar seamless section having protruding flanges to which the edges of the facing plates of one double skin panel are welded.

In a further aspect, the invention provides a structure comprising a first generally horizontal double skin composite panel and a second generally vertical double skin composite panel, each panel comprising two metal facing plates joined together by a plurality of transverse cross-members and filled with a cementitious material and a connector for joining the panels together, the connector comprising a plurality of non-planar sections welded together to define a hollow section to which the facing plates of the respective panels are welded.

The invention will now be described by way of example with reference to the accompanying diagrammatic drawings in which.

Figure 4:
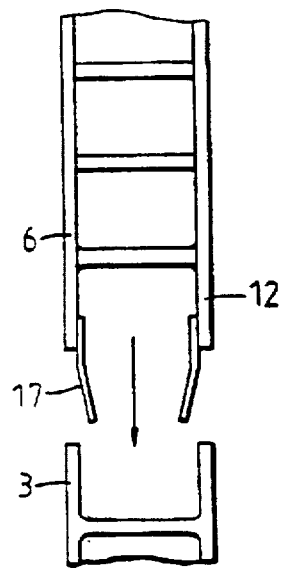
Figure 5:
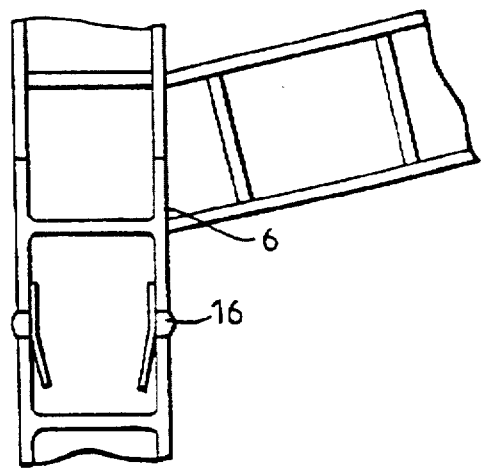
Figure 6:
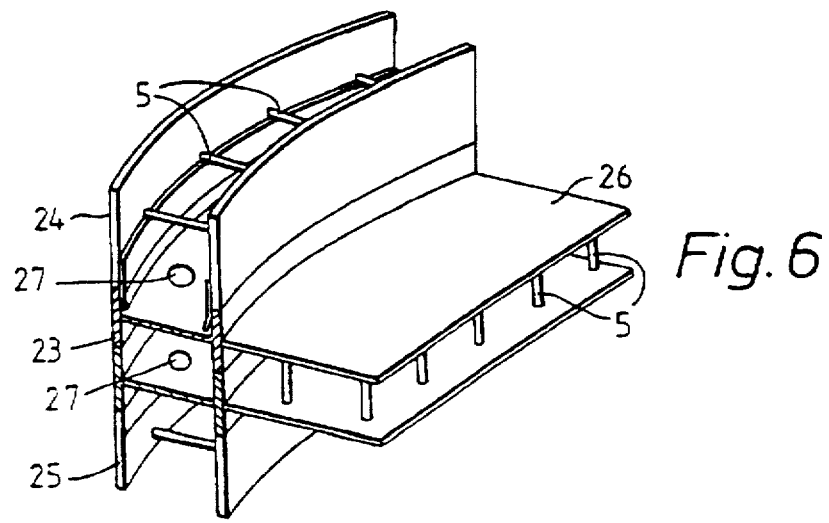

FIGS. 4 and 5 diagrammatically illustrate the assembly of a double skin composite structure in accordance with the invention; and FIG. 6 is a perspective view of a double skin composite structure in accordance with the invention after assembly.

Figure 1:
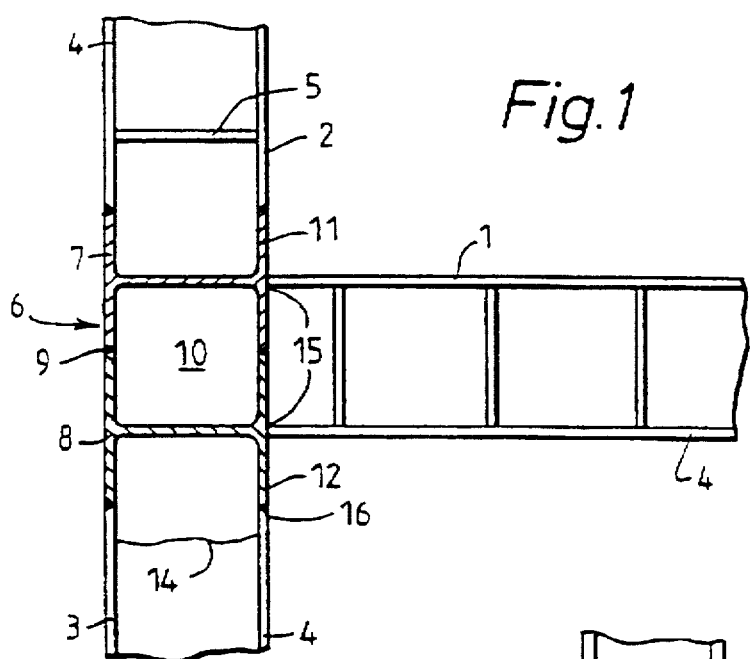
FIG. 1 is a side view in section of a double skin composite structure in accordance with the invention.

The structure illustrated in FIG. 1 comprises a horizontal double skin composite structure prefabricated by welding together a generally horizontal prefabricated double skin composite panel and two vertical double skin composite panels 2, 3. Each double skin composite panel comprises a pair of generally parallel steel facing plates 4 joined together by a plurality of transverse metal crossmembers members 5 each welded at each of its ends to the adjoining facing plate. The spacing between the facing plates is subsequently filled with a filler material, conventionally concrete.

The fabricated panels 1, 2, 3 are joined by a connector 6 prefabricated from two non-planar seamless sections in the form of hot rolled steel sections 7, 8 secured together by welds 9 to define a hollow section 10 from which protrude upwardly extending flanges 11 and downwardly extending flanges 12.

It has been established that forces and hence stresses in double skin composite structures tend to concentrate at the sites of the connections between the joined panels and the use of non-planar seamless sections such as hot-rolled sections (as opposed to sections produced simply by welding a web to one or more flanges) has been found to be highly advantageous. This is firstly because local increases in plate thickness at the interconnections between the webs and the flanges produced by hot rolling provides added strength which counteracts and reduces stress concentrations. Secondly, the radius produced by hot rolling at the interconnections between the webs and flanges ensures that forces flow between the joined structures again reducing stress concentrations and extending fatigue life. A further advantage is that hot rolled sections can readily be bent to a radius thereby enabling their use in both flat and curved constructions.

Before assembly of the prefabricated panels, panel 3 is filled with concrete to the level indicated by reference numeral 14. The hollow section 10 of the connector 6 is then welded to the facing plates 4 of the respective end of the horizontal panel 1 along welds 15 between the abutting edges of the facing plates of the panel 1 and the outer face of the hollow section 10 defined by hot rolled sections 7, 8. Generally the facing plates will be arranged to line up with the web of any section making up the connector. Panel 1 and the attached connector 6 is then assembled onto the panel 3 by making welds 16 between the edges of the downwardly extending flanges 12 of the lower hot rolled section 8 and the steel facing plates of the lower vertical prefabricated panel 3.

As will be seen from FIGS. 4 and 5, guides 17 may be attached to the internal surfaces of the flanges 12 of the hot rolled section 8 to assist accurate assembly. Alternatively, the guides 17 may be attached to the internal surfaces of the facing plates of panels 2 and 3. The guides 17 are inwardly inclined and may be formed with openings for the flow of cement therethrough.

In addition to assisting accurate assembly, the guides 17 can be used as backing plates for welds made between the structures following assembly.

At the appropriate time, the upper vertical prefabricated panel 2 is positioned on the upstanding flanges 11 of the upper hot rolled section 7. The facing plates of panel 2 are then welded to the adjoining flanges 11. Concrete is subsequently introduced into the prefabricated panel to fill the same. Alternatively, the concrete may be pumped into the void above reference line 14, holes being provided in the flanges of the hot rolled sections 7, 8 to allow the concrete to fill the voids and the prefabricated panel 2.

As shown in FIG. 5, a panel 18 is subsequently welded to one side of the connector between the composite structures. This panel 18 may be inclined as illustrated or lie substantially horizontal.

Figure 2:
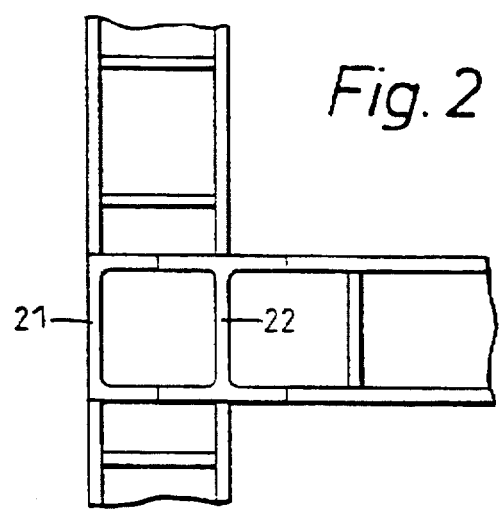
FIGS. 2 and 3 are side or plan views in section of alternative double skin composite structures in accordance with the invention.
Figure 3:
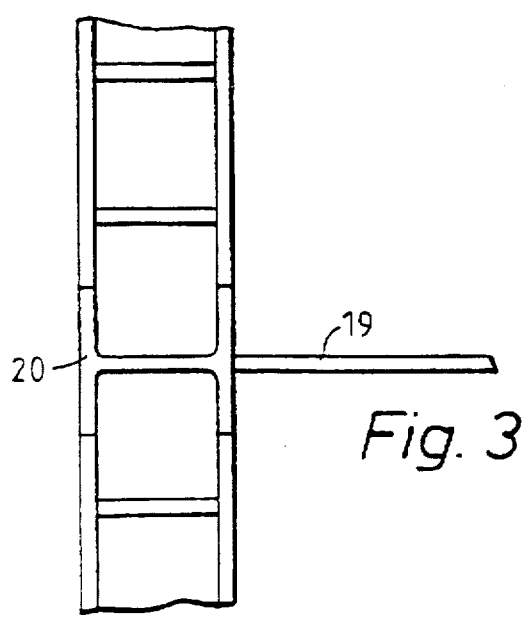

In the construction illustrated in FIG. 2, the connector between the pre-fabricated horizontal and vertical panels is fabricated by welding together a channel-shaped hot rolled section 21 and a hot rolled "T" section 22. In the construction illustrated in FIG. 3, a single steel sheet 19 is welded to one side face of an "T" seamless section 20. Assembly of the structures is similar to that described above. The constructions illustrated in FIGS. 1 and 2 of the drawings are merely exemplary of many constructions which can be employed in accordance with the invention.

An assembled joined structure is illustrated in FIG. 6. It will be seen that the hot rolled connector 23 and the joined double skin composite vertical panels 24, 25 are curvilinear with the adjoining edge of the horizontal panel 26 suitably shaped to complement the curved face of the connector 23. Holes 27 are formed in the connector 23 for the flow of filler material.

It will be appreciated from the foregoing that by using hot rolled sections in accordance with the invention, the number of welds which are inaccessible is minimised, only one of the welds of the construction illustrated in FIG. 1 being entirely inaccessible once concrete has been introduced into the prefabricated sections. This weld is located in the relatively thicker, and hence lower stressed, flange of the connector and is unlikely to be of concern. Also, with the construction illustrated, stresses which tend to be concentrated at the connector can readily be offset by using hot rolled sections which result in local increases in face plate thickness. This thickening acts generally to reduce stresses in critical regions. Furthermore, hot rolled sections have radii where the web and flanges interconnect; these radii help forces to flow from one structure to another thereby reducing stress concentrations and extending fatigue life.

As mentioned above, hot rolled sections can be bent to a radius, thereby enabling their use in both flat and curved constructions, greatly saving on fabrication effort.

It will be appreciated that the foregoing is merely Exemplary of structures in accordance with the invention and that modifications can readily be made thereto without departing from the true scope of the invention as set out in the appended claims.

We claim:

1. A double skin composite structure in which neighbouring double skin composite panels of the structure are connected by welding, the structure being characterised in that the composite panels are welded to a connector fabricated from one or more non-planar seamless sections, the or each seamless section being produced as a single piece and including two or more lengthwise extending elements each of which is inclined to its neighbouring element.

2. A structure as claimed in claim 1 in which the connector is fabricated from two non-planar seamless sections secured together by welds to define hollow section from which protrude flanges to which edges of facing plates of an adjoining panel are secured.

3. A structure as claimed in claim 1 in which the or each non-planar seamless section is a hot rolled section.

4. A structure as claimed in claim 1 in which the or each non-planar seamless section is an extruded section.

5. A structure as claimed in claim 1 in which the or each non-planar seamless section is a cold formed section.

6. A structure as claimed in claim 1 in which the or each non-planar seamless section is a cast section.

7. A structure as claimed in claim 1 wherein guides are secured to internal surfaces of flanges which protrude from the connector, the guides being positioned such that they align with internal surfaces of an adjoining panel to assist assembly.

8. A connector which defines a joint between two doubled skin composite panels to produce a structure, each such double skin composite panel comprising a pair of metal facing plates joined together by a plurality of cross-members and filled, at least partially, with a filler material, and each such cross-member being connected to one or both facing plates, the connector comprising at least one non-planar seamless section having protruding flanges to which edges of the facing plates of one double skin panel are welded, the or each seamless section being produced as a single piece and including two or more lengthwise extending elements each of which is inclined to its neighbouring element.

9. A connector as claimed in claim 8 which comprises a plurality of non-planar seamless sections welded together to define a box section with protruding flanges to the edges of which the facing plates of one double skin panel are welded, the facing plates of the other double skin panel being welded to one side of the box section.

10. A connector as claimed in claim 8 wherein one panel is disposed at an angle of or approaching 90° to the other panel.

11. A connector as claimed in claim 8 wherein guides are secured to internal surfaces of the protruding flanges to assist alignment of the connector and an adjoining panel to be welded thereto.

12. A structure comprising a first generally horizontal double skin composite panel and a second generally vertical double skin composite panel, each panel comprising two metal facing plates joined together by a plurality of transverse metal cross-members and filled with a cementitious material and a connector joining the panels together, the connector comprising a plurality of non-planar seamless sections welded together to define a hollow section having protruding flanges to which the facing plates of the respective panels are welded.

13. A connector as claimed in claim 8 wherein holes are formed in one or more connector surfaces for through flow of filler material.

* * * * *

UNITED STATES PATENT AND TRADEMARK OFFICE
CERTIFICATE OF CORRECTION

PATENT NO. : 5,797,235
DATED : AUGUST 25, 1998
INVENTOR(S) : HUGH GORDON BOWERMAN ET AL.

It is certified that error appears in the above-identified patent and that said Letters Patent is hereby corrected as shown below:

On the Title Page, [57] ABSTRACT, line 3, delete "icing", insert --facing--

Col. 4, line 46, delete "define hollow section", insert --define a hollow section--

Signed and Sealed this

Tenth Day of August, 1999

Attest:

Q. TODD DICKINSON

*Attesting Officer*     *Acting Commissioner of Patents and Trademarks*